Dec. 9, 1969    P. J. MALDEN ET AL    3,482,685

METHOD OF IMPROVING THE WHITENESS OF CLAYS

Filed April 4, 1966

# United States Patent Office 3,482,685
Patented Dec. 9, 1969

3,482,685
METHOD OF IMPROVING THE WHITENESS OF CLAYS
Peter James Malden and William Windle, Cornwall, England, assignors to English Clays Lovering Pochin & Company Limited, Cornwall, England, a British company
Filed Apr. 4, 1966, Ser. No. 539,979
Claims priority, application Great Britain, Apr. 9, 1965, 15,315/65
Int. Cl. B03c 7/00, 1/00
U.S. Cl. 209—5      3 Claims

ABSTRACT OF THE DISCLOSURE

The process for improving the brightness of a fine clay is disclosed wherein the clay is deflocculated and a deflocculated clay slip is subjected to a high intensity, non-homogeneous magnetic field whereby discoloring paramagnetic impurities present in the clay are separated therefrom.

---

This invention relates to a method of improving the whiteness or reflectance of kaolin clays, particularly when intended for use as paper clays and ceramic clays.

Paper clays are generally comprised of clay particles of less than about 10 microns in diameter and it is usually desired that the clays should dry to a white colour when used. However, such clays are often contaminated by particles of minerals other than kaolinite, such as, for example, tourmaline, mica, felspar, quartz, rutile and illmenite. These minerals in the natural state usually have associated with them small quantities of iron, which has the effect of imparting paramagnetic behaviour to the minerals, and the presence of such minerals in the clay results in discolouring of the clay.

According to the present invention, there is provided a method of improving the whiteness of fine clay, which comprises forming a clay slip and subjecting the clay slip to a high intensity magnetic field having an average field strength of at least 1500 gauss to separate paramagnetic mineral particles therefrom.

The particle size of the fine clay which is treated is preferably not more than 10% by weight above 10 microns and about 50% by weight less than 2 microns when the clay is to be used as a paper filler, and is preferably of a particle size less than 1% by weight above 10 microns and about 80% by weight less than 2 microns when the clay is to be used for coating paper. In addition, clays are usually employed, the particle size of which is mainly above 1 micron, e.g. at least 90% of the particles, since particles of a size less than 1 micron are less readily separated by the method of the invention because, for a given concentration of paramagnetic ions, the magnetic force on a particle is proportional to the particle volume. The clay slip is also preferably deflocculated before the separation treatment.

The solids content of the clay slip is not critical and is really governed only, as regards a maximum solids content, by the need for fluidity and low viscosity and, as regards the minimum solids content, by economical considerations. Preferred solids contents are from 5 to 20%.

The magnetic field employed is preferably non-homogeneous and is preferably of an average field strength between 1500 and 15,000 gauss. Below this range, the method is inclined to be inefficient, while the upper limit is set only by the practicability of attaining such field strengths. The non-homogeneity of the magnetic field may be conveniently attained by using pole pieces, one or both of which is provided with one or a plurality of grooves or protrusions.

Preferably, a stationary separation is carried out, the clay slip being subjected to the action of the magnetic field for a period of time, depending inter alia on the strength of magnetic field employed, sufficient to separate a satisfactory proportion of the colouring impurities, for example several hours. At the end of this period, the resultant purified slip is normally drawn off leaving the magnetic material in the separator, from which it can be thereafter removed. If desired, the slip may be treated in the separator for one or more additional times to effect successive removals of paramagnetic particles and achieve further slight improvements of colour.

The clays treated by the method of the invention generally possess improved whiteness, which can be observed from the improved reflectance values obtained for the clays. In addition, the whiteness improvement is achieved without appreciable alteration in the particles size distribution of the clay. Moreover, the invention is applicable to very fine clays, not normally capable of adequate treatment by the conventional methods.

The following example illustrates the invention.

EXAMPLE

A clay sample consisting substantially wholly of particles of a size range of from 1 to 2.5 microns was deflocculated at a pH of 8 by the addition of 0.5% by weight of sodium hexametaphosphate. A clay slip having a solids content of 16.6% by weight was obtained by conventional sedimentation and was placed in a magnetic separator of the type shown in the accompanying drawing, in which.

Figure 1:
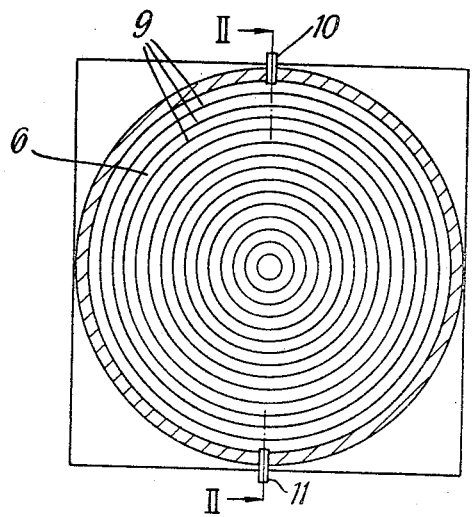
FIGURE 1 is a sectional view of a cell for use in the magnetic separator.
Figure 2:
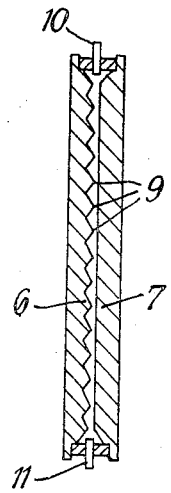
FIGURE 2 is a transverse sectional view of the cell shown in FIGURE 1, taken along the line II—II of FIGURE 1.
Figure 3:
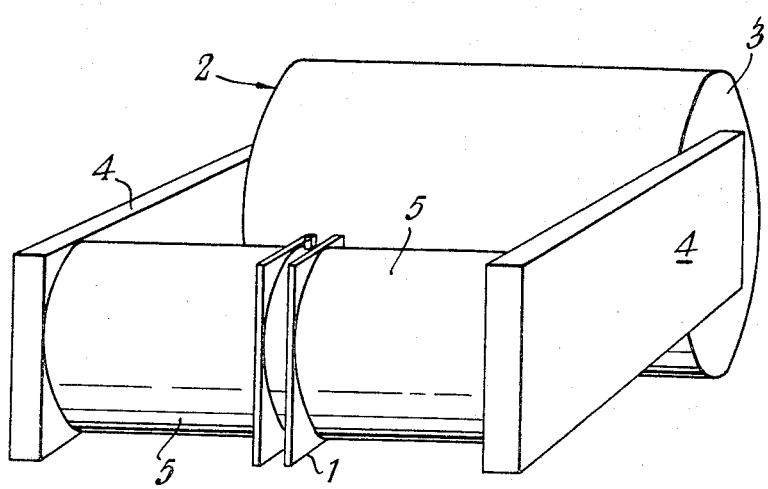
FIGURE 3 shows an assembled magnetic separator having a cell as shown in FIGURES 1 and 2 in position therein.

Referring now to the drawing, the magnetic separator consisted of a cell 1 between the poles of an electro-magnet 2, comprising a coil 3 having at each end thereof an extension 4, between the ends of which extensions are disposed two pole pieces 5 having mutually opposed other ends between which the cell 1 can be inserted. The cell 1 comprised two stainless iron plates 6 and 7 each of about fifteen inches in diameter, held vertically and in contact with the pole pieces of the electro-magnet, the plates being separated by a brass ring 8 which makes leak-proof contact with the faces of the two plates via rubber O rings (not shown). The face of the plate 7 was smooth and flat and the face of the plate 6 was machined into a series of concentric, sharp-edged ridges 9. The distance between the tops of the ridges 9 and the face of the opposite plate 7 was about ⅛ inch. During the separation treatment, the clay slip occupied the space between the two plates 6 and 7 and bounded by the brass ring 8. The clay slip was introduced into this space by way of a tube 10 at the top of the cell 1 and extracted by way of a tube 11 at the bottom of the cell. The average field strength in the gap between the two plates was 2,200 gauss and was maintained for 16 hours. The cell was then drained of the clay slip, magnetic material which had collected on the edges of the ridged plate was removed and the clay slip replaced in the cell. The means for supplying clay slip to the tube 10 and of removing it from tube 11 are not shown. The process was repeated up to 14 times after which the slip was finally removed from the cell and the purified product separated therefrom.

The magnetically purified product possessed reflectance to violet and yellow light, respectively, of 90.4 and 94.4, whereas the original clay fraction possessed reflectances to violet and yellow light, respectively, of 85.8 and 92.8.

We claim:

1. A method of improving the brightness of a fine clay containing at least 90% by weight of particles having an equivalent spherical diameter smaller than 10 microns and at least 50% by weight of particles having an equivalent spherical diameter smaller than 2 microns, which method comprises the steps of (a) forming said fine clay into a deflocculated aqueous clay slip having a solids content in the range of from 5 to 20% by weight and (b) subjecting the deflocculated clay slip for several hours to a high intensity, non-homogeneous magnetic field having an average field strength of at least 1500 gauss and produced between pole pieces, at least one of which is formed with a plurality of protuberances extending towards the other pole piece, whereby discoloring paramagnetic mineral impurities present in said clay are separated therefrom.

2. A method according to claim 1, wherein at least 90% of the clay particles have an equivalent spherical diameter greater than 1 micron.

3. A method according to claim 1, wherein step (b) is repeated at least one additional time.

References Cited

UNITED STATES PATENTS

| | | | |
|---|---|---|---|
| 90,565 | 5/1869 | Lynd | 209—215 X |
| 2,074,085 | 3/1937 | Frantz | 209—215 X |
| 2,088,364 | 7/1937 | Ellis | 209—232 X |
| 2,156,125 | 4/1939 | Payne | 209—232 X |
| 2,990,958 | 7/1961 | Greene | 209—166 |
| 3,021,007 | 2/1962 | Jones | 209—232 X |

FOREIGN PATENTS 188,289  3/1956  Austria.

HARRY B. THORNTON, Primary Examiner

ROBERT HALPER, Assistant Examiner

U.S. Cl. X.R.

106—72; 209—214